US010161591B2

(12) United States Patent
Rice et al.

(10) Patent No.: US 10,161,591 B2
(45) Date of Patent: Dec. 25, 2018

(54) THIN WALL INTERNAL REFLECTION LIGHT OPTIC

(71) Applicants: Lawrence M. Rice, Hillsboro, NH (US); Thomas Tessnow, Weare, NH (US)

(72) Inventors: Lawrence M. Rice, Hillsboro, NH (US); Thomas Tessnow, Weare, NH (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 538 days.

(21) Appl. No.: 14/841,000

(22) Filed: Aug. 31, 2015

(65) Prior Publication Data

US 2017/0059107 A1 Mar. 2, 2017

(51) Int. Cl.

| | |
|---|---|
| ***F21V 5/00*** | (2018.01) |
| ***F21V 7/00*** | (2006.01) |
| ***G02B 27/00*** | (2006.01) |
| ***F21S 8/10*** | (2006.01) |
| ***F21S 41/143*** | (2018.01) |
| ***F21S 41/24*** | (2018.01) |
| ***F21S 41/32*** | (2018.01) |

(52) U.S. Cl.

CPC ......... *F21S 48/1154* (2013.01); *F21S 41/143* (2018.01); *F21S 41/24* (2018.01); *F21S 41/322* (2018.01)

(58) Field of Classification Search

CPC ...... F21S 41/143; F21S 41/322; F21S 41/323; F21S 41/334; F21S 41/335; F21S 41/336; F21S 41/337; F21S 41/33824; F21S 43/315; F21V 7/0091; F21V 7/048; F21V 5/002; F21V 13/04; F21V 13/045; F21V 5/045; G02B 19/0028; F21K 9/68; F21K 9/69

USPC .......................................................... 359/613

See application file for complete search history.

(56) References Cited

U.S. PATENT DOCUMENTS 2,215,900 A 9/1940 Bitner
5,577,492 A * 11/1996 Parkyn, Jr. .............. F24S 23/31 126/698

(Continued)

OTHER PUBLICATIONS

Application Note “TIR Lens Guide” published by LEDiL Oy (Salo, Finland) obtained on company’s website www.ledil.com (8 pages, in color).

*Primary Examiner* — Erin Kryukova
(74) *Attorney, Agent, or Firm* — Edward S. Podszus

(57) ABSTRACT

An example lamp optic comprises a light guide (100) to receive light from a light source (108) and generate a light beam via internal reflection. The light guide includes a proximal end (104) to receive the light and a distal end (106) to emit the light beam. An optical axis (OA) extends from the proximal end to the distal end, and a transverse axis (TA) extends perpendicular to the optical axis. A surface of the distal end has a stepped portion (110) including a central surface (112) substantially parallel to the transverse axis and centered on the optical axis, and linear steps (114) extending in opposing directions from the central surface parallel to the transverse axis and along the optical access towards the distal end. Each linear step includes an optical face (116) extending perpendicular to the optical axis and a transverse face (118) extending perpendicular to the transverse axis.

23 Claims, 5 Drawing Sheets

(56) References Cited

U.S. PATENT DOCUMENTS

| | | | | |
|---|---|---|---|---|
| 6,097,549 | A * | 8/2000 | Jenkins | B60Q 1/302 359/726 |
| 6,536,923 | B1 * | 3/2003 | Merz | F21V 7/0091 362/327 |
| 6,755,556 | B2 | 6/2004 | Gasquet | |
| 6,819,505 | B1 | 11/2004 | Cassarly et al. | |
| 6,953,271 | B2 | 10/2005 | Ayniéet et al. | |
| 7,270,454 | B2 | 9/2007 | Amano | |
| 7,275,849 | B2 | 10/2007 | Chinniah et al. | |
| 7,290,908 | B2 * | 11/2007 | Amano | F21S 43/14 362/520 |
| 7,473,013 | B2 | 1/2009 | Shimada | |
| 8,066,402 | B2 | 11/2011 | Klipstein | |
| 8,068,288 | B1 | 11/2011 | Pitou | |
| 8,449,150 | B2 | 5/2013 | Allen et al. | |
| 8,562,191 | B2 * | 10/2013 | Okada | F21S 48/215 362/309 |
| 8,905,608 | B2 | 12/2014 | Günther | |
| 8,944,642 | B2 * | 2/2015 | Kuo | F21V 5/04 362/308 |
| 9,574,734 | B2 * | 2/2017 | Sousek | F21S 48/215 |
| 2004/0141323 | A1 * | 7/2004 | Aynie | F21V 7/0091 362/308 |
| 2005/0111235 | A1 * | 5/2005 | Suzuki | B60Q 1/2696 362/555 |
| 2005/0162857 | A1 * | 7/2005 | Tsukamoto | F21V 7/0091 362/509 |
| 2007/0064431 | A1 * | 3/2007 | Fallahi | F21V 5/045 362/334 |
| 2008/0310028 | A1 * | 12/2008 | Chinniah | F21V 5/04 359/642 |
| 2008/0310159 | A1 * | 12/2008 | Chinniah | F21V 5/04 362/244 |
| 2010/0157616 | A1 * | 6/2010 | Nakada | F21S 43/315 362/487 |
| 2011/0249462 | A1 * | 10/2011 | Koizumi | B60Q 1/302 362/519 |
| 2012/0155103 | A1 * | 6/2012 | Okada | F21S 41/24 362/518 |
| 2013/0120985 | A1 * | 5/2013 | Jiang | F21V 13/04 362/235 |
| 2014/0036526 | A1 * | 2/2014 | Sato | F21S 41/24 362/518 |
| 2014/0268848 | A1 * | 9/2014 | Tessnow | F21S 48/1241 362/511 |
| 2014/0362588 | A1 * | 12/2014 | Wu | F21V 13/04 362/327 |
| 2016/0312977 | A1 * | 10/2016 | Jiang | F21V 5/045 |

* cited by examiner

THIN WALL INTERNAL REFLECTION LIGHT OPTIC

TECHNICAL FIELD

The present disclosure relates to lamps comprising at least one light source and a light guide having glare-reducing features that may be applicable to, for example, vehicular lighting.

BACKGROUND

At least one area of concentration for electronic technology development is designing products that operate with increased efficiency, reliability, etc. over longer periods of time. For example, at least one area of development where this trend is highly visible is lighting. Existing incandescent bulb technology is quickly being replaced by compact fluorescent lamp (CFL) and light emitting diode (LED)-based light sources. CFL and LED-based light sources may perform better (e.g., with higher efficiency) and may comprise longer lifetimes than existing incandescent light sources. As a result, many applications are transitioning to these new lighting technologies.

An example application in which LED-based lighting is utilized is in vehicular lighting. For example, automotive lighting such as headlights benefit from the long life, efficiency and reliability of LEDs. LEDs typically do not emit light in a manner focused enough to generate a headlight beam, and thus a light guide may be employed to generate a beam based on the light produced by at least one LED. Total internal reflection (TIR) may be used to very efficiently reflect light generated by the at least one LED light source internally within the light guide to focus the light into a light beam usable as a headlight. Solid TIR light guides operate with high efficiency, but are hard to manufacture (e.g., mold) as the size of the light device (e.g., headlight) increases. Orbital thin wall TIR light guides such as illustrated in U.S. Pat. No. 8,068,288 B1 (Pitou) are easier to manufacture than solid TIR light guides. However, thin wall TIR light guides generate extensive unfocused peripheral light (e.g., glare) that may obstruct the vision of a driver at night.

SUMMARY

In a least one embodiment, a lamp optic comprises at least a light guide to receive light from a light source and generate a light beam using the received light. The light guide generates the light beam via internal reflection (e.g., TIR). The light guide includes a proximal end to receive the light and a distal end to emit the light beam. An optical axis extends from the proximal end to the distal end, and a transverse axis extends perpendicular to the optical axis. A surface of the distal end has a stepped portion formed therein, the stepped portion including a central surface substantially parallel to the transverse axis and centered on the optical axis, and linear steps extending in opposing directions from the central surface parallel to the transverse axis and along the optical access towards the distal end. Each linear step includes an optical face extending perpendicular to the optical axis and a transverse face extending perpendicular to the transverse axis. Other example configurations that will be disclosed herein may include, but are not limited to, changes in the configuration of light guide regarding a lateral surface, step angle, optical face, etc.

This overview is intended to provide an overview of subject matter of the present patent application. It is not intended to provide an exclusive or exhaustive explanation of the subject matter. The detailed description is included to provide further information about the present patent application.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION OF PREFERRED EMBODIMENTS INCLUDING BEST MODE

In the following description, for purposes of explanation, numerous specific details are set forth in order to provide a thorough understanding of the present disclosure. It may be evident, however, to one skilled in the art, that the subject matter of the present disclosure may be practiced without these specific details. Moreover, technologies, structures, terms of art such as "total internal reflection," etc. may be referenced herein to provide a readily comprehensible perspective from which the more general teachings of the disclosure may be understood. These references are merely explanatory, and are not intended to limit embodiments consistent with the present disclosure to a particular manner of implementation. Other implementations consistent with the present disclosure are possible without departing from the teachings disclosed herein.

Figure 1:
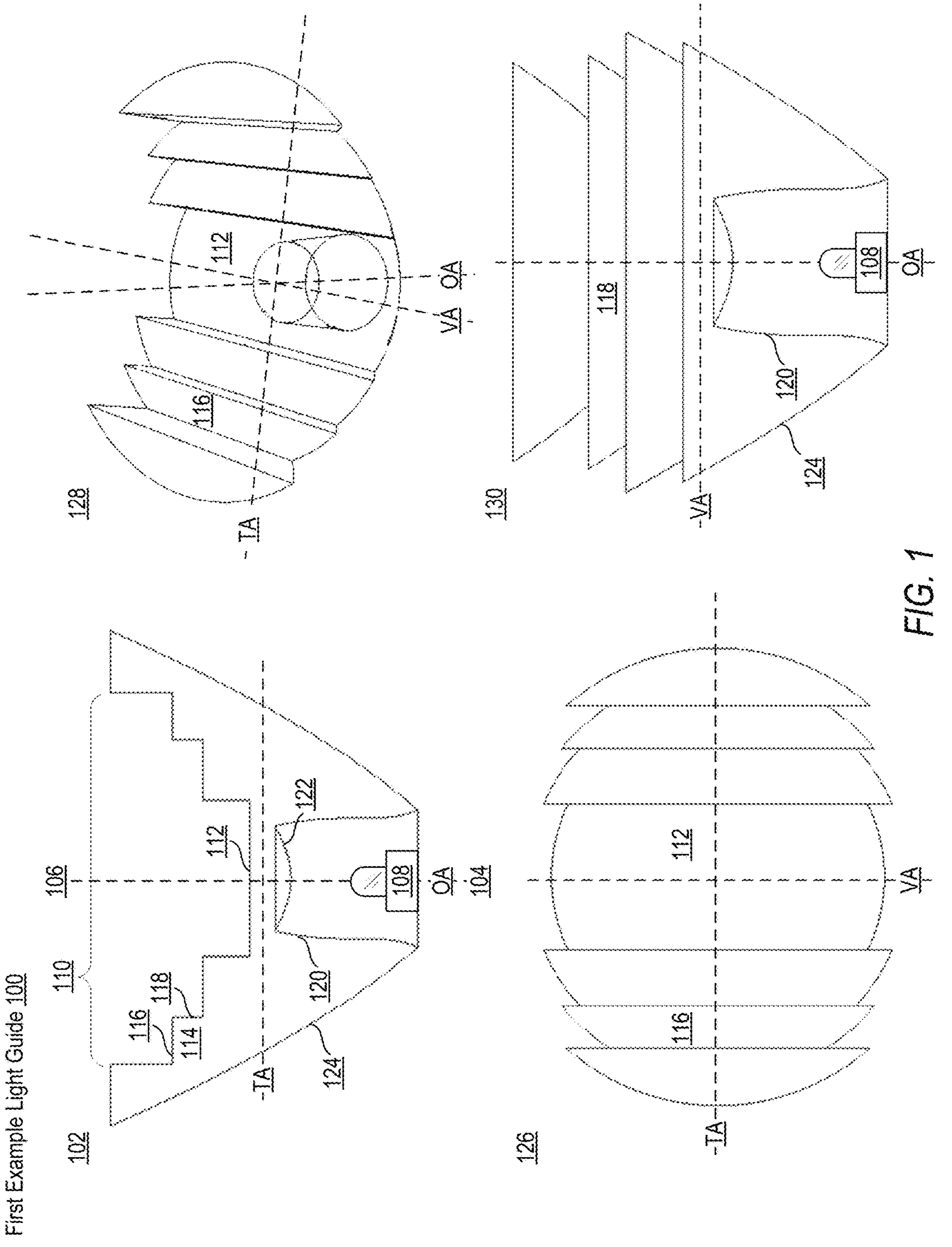
FIG. 1 illustrates a first example light guide from various directions consistent with the present disclosure.

FIG. 1 illustrates a first example light guide 100 from various directions consistent with the present disclosure. In general, as opposed to existing light guide geometries, the light guide 100 comprises linear steps 114 that substantially reduce the amount of glare experienced along vertical axis (VA). This reduction in vertical glare is especially valuable in applications such as automotive headlights where the glare may obstruct the vision of drivers when driving at night. Any of the example light guides disclosed herein are formed from a material that is transparent in the visible portion of the spectrum, such as from glass or plastics. Examples of usable materials may include, but are not limited to, polycarbonate, acrylic, silicone, etc. In particular, any of the example light guides disclosed herein may be formed from polymethyl methacrylate (PMMA) or MAKRALON® 2245 brand polycarbonate plastics material from Bayer Material Science. Any of the example light guides disclosed herein may be formed by molding, grinding and polishing (e.g., performed alone or in combination), or through another suitable manufacturing process.

Light guide 100 is shown in FIG. 1 from a first side view 102, a front view 126, a perspective view 128 and a second side view 130. In first side view 102, the optical axis OA extends vertically and the transverse axis TA runs horizontally. Proximal end 104 of the first example light guide 100 comprises a recess 120 to receive light source 108. The light source 108 preferably includes at least one LED, but other embodiments may include, for example, an incandescent light source, a fluorescent light source, a gas-discharge light source (e.g., a sodium-vapor lamp), etc. At least a light emitting portion of light source 108 is inserted into the recess 120, which is configured to receive light emission from all directions. In at least one embodiment, the recess 120 includes a lens 122 formed into an upper surface to, for example, control how light generated by the light source 108 is focused for light beam forming.

The distal end 106 comprises at least a stepped portion 110 formed therein. Light from light 108 that is internally reflected within the first example light guide 100 may exit as a light beam from at least the stepped portion 110. The stepped portion 110 comprises central surface 112 and a plurality of linear steps 114 (an example of which is shown at 114 in FIG. 1). Each linear step 114 includes an optical face 116 and a traverse face 118. When both the optical face 116 and the transverse face 118 are planar, they are also orthogonal to each other. The size of the optical face 116 and the transverse face 118 may vary based on a number of factors. For example, the size of the optical face 116 and the transverse face 118 may be selected based on the size of first example light guide 100, the desired optical characteristics of first example light guide 100 (e.g., beam size, shape, intensity, etc.), the manufacturing limitations of example light guide 100 (e.g., molding requirements such as minimum mold/material feature tolerances, fillet radius, etc.), the desired mechanical characteristics of the first example light guide 100 (e.g., resistance to mechanical wear, temperature and other environmental stresses, etc.), etc.

The first example light guide 100 also includes lateral surface 124. Lateral surface 124 covers the exterior of first example light guide 100. The front view 126 of first example light guide 100 includes the TA and a vertical axis (VA) perpendicular to the TA. The front view demonstrates the relationship of the optical faces 116 to the central surface 112 and how the length of steps 114 is linear (e.g., that steps 114 are linear steps) and parallel to the VA. The perspective view 128 of the first example light guide 100 also demonstrates these relationships. The second side view 130 of the first example light guide 100 illustrates an alternative example view of the transverse face 118, the recess 120 and the lateral surface 124.

Figure 2:
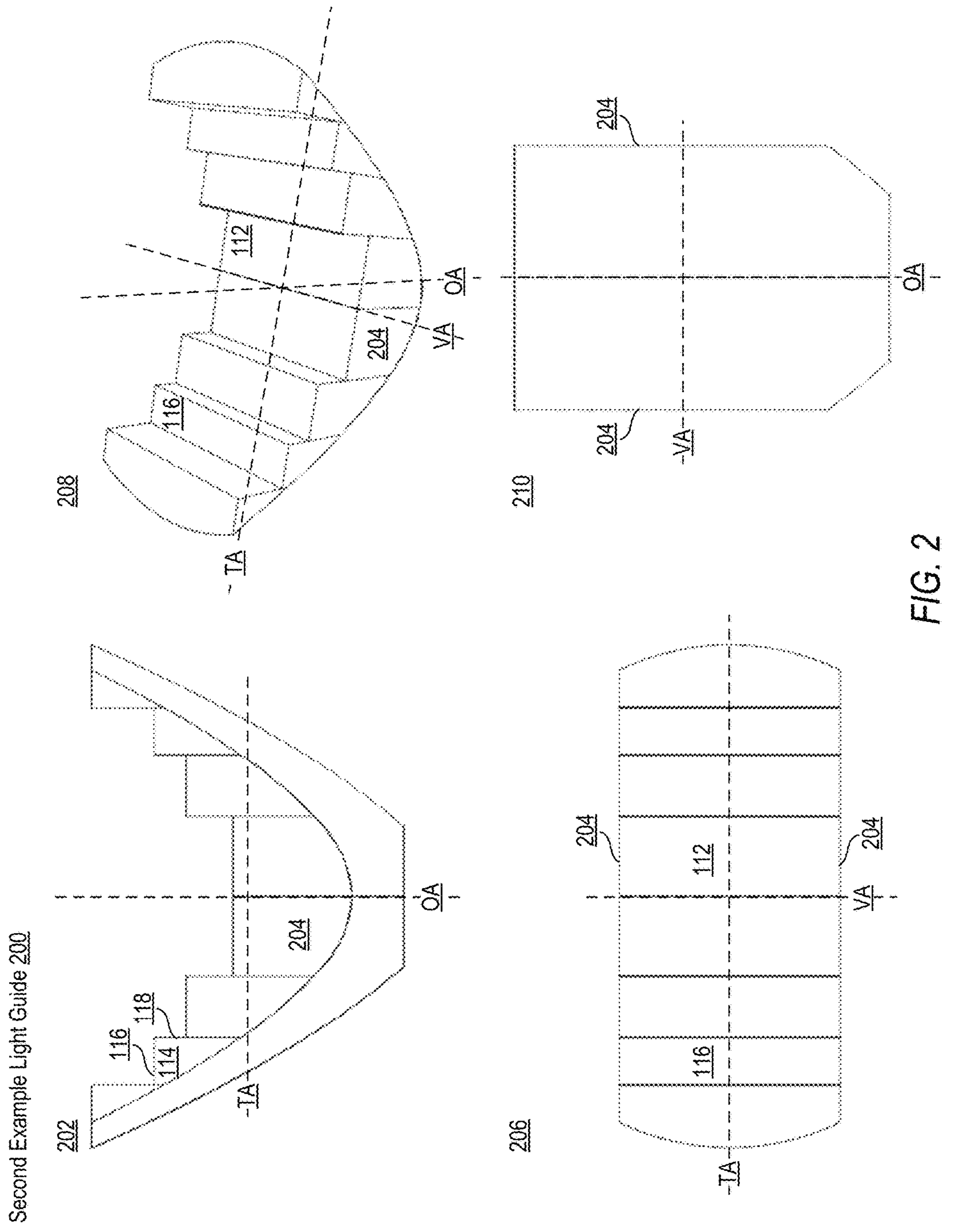
FIG. 2 illustrates a second example light guide from various directions consistent with the present disclosure.

FIG. 2 illustrates a second example light guide 200 from various directions consistent with the present disclosure. Item numbers corresponding to the same or similar features in the drawing figures are maintained the same throughout the figures to show correspondence between these features in different embodiments. In general, the second example light guide 200 may be similar to the first example light guide 100 except that the lateral surface 120 may comprise at least two planar portions 204.

FIG. 2 illustrates second example light guide 200 from a first side view 202, a front view 206, a perspective view 208 and a second side view 210. In first side view 202 the planar portion is shown at 204. The amount that the first example light guide 100 is "cut down" (e.g., the amount of material that is removed from the first example light guide 100 with respect to at least the planar portions 204) depends on, for example, the particular application for which second light guide 200 is intended. For example, in a vehicular application it may depend on whether the second example light guide 200 is for a headlight, a fog light, a side illumination light, the type/size/height of the vehicle in which second example light guide 200 will be installed, etc. The planar portions 204 are seen in greater clarity in the front view 206, the perspective view 208 and the second side view 210. In at least one embodiment, the second example light guide may comprise two planar portions 204 located on opposing sides of the second example light guide 200, wherein the two planar portions 204 are perpendicular to VA.

Figure 3:
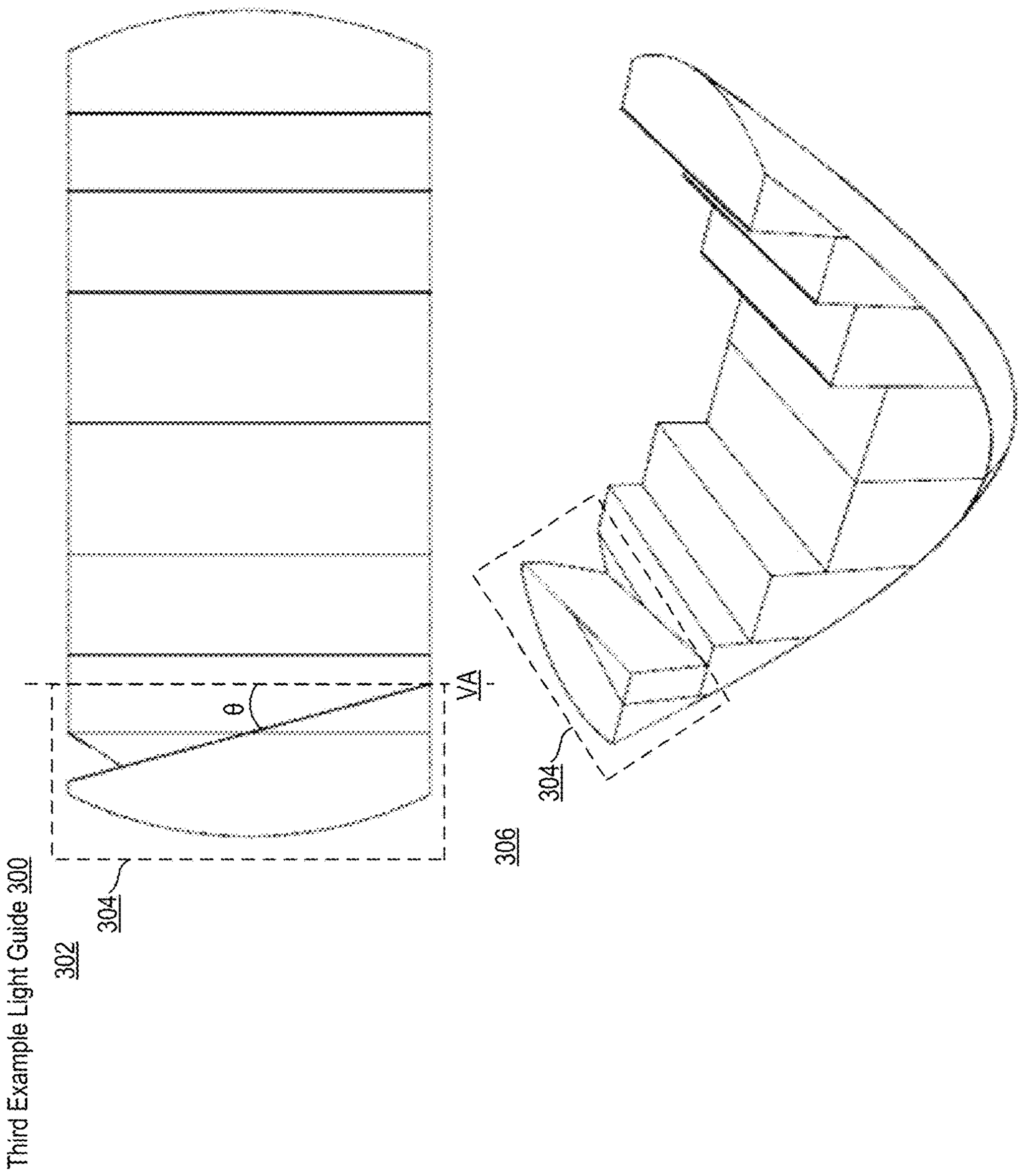
FIG. 3 illustrates a third example light guide from various directions consistent with the present disclosure.

FIG. 3 illustrates a third example light guide from various directions consistent with the present disclosure. A third example light guide 300 is based on the second example light guide 200 illustrated in FIG. 2 except that at least one outermost linear step 304 (e.g., draft wall) may be angled with respect to VA. Angling the outermost linear step 304 alters the light beam emitted by the third example light guide 300 to comply with headlight light output regulations in some jurisdictions. For example, European automobile headlight light emission requirements are controlled by the United Nations Economic Mission for Europe (ECE, having a website located at www.unece.org), which stipulates in ECE Regulation No. 112 that the curb side of a headlight must emit a light beam that is extended or curved to form an emission pattern different than what is now required in the United States. The light beam emission of the third example light guide 200 achieves this requirement via the implementation of the angled outermost linear step 304.

FIG. 3 illustrates the third example light guide from a front view 302 and a perspective view 306. In the front view 302, the outermost linear step is set at an angle θ from VA. In at least one embodiment the angle θ may be 15 degrees. When the third example light guide 300 is employed as a vehicular headlight, light focused on the angled outermost linear step 304 (e.g., redirected from light source 108 via TIR) may be directed at an angle to curve around the front of vehicle. This curvature of the emitted light beam may fulfill requirements such as those set forth in ECE rule 112 regarding the required performance of vehicular headlights in Europe.

Figure 4:
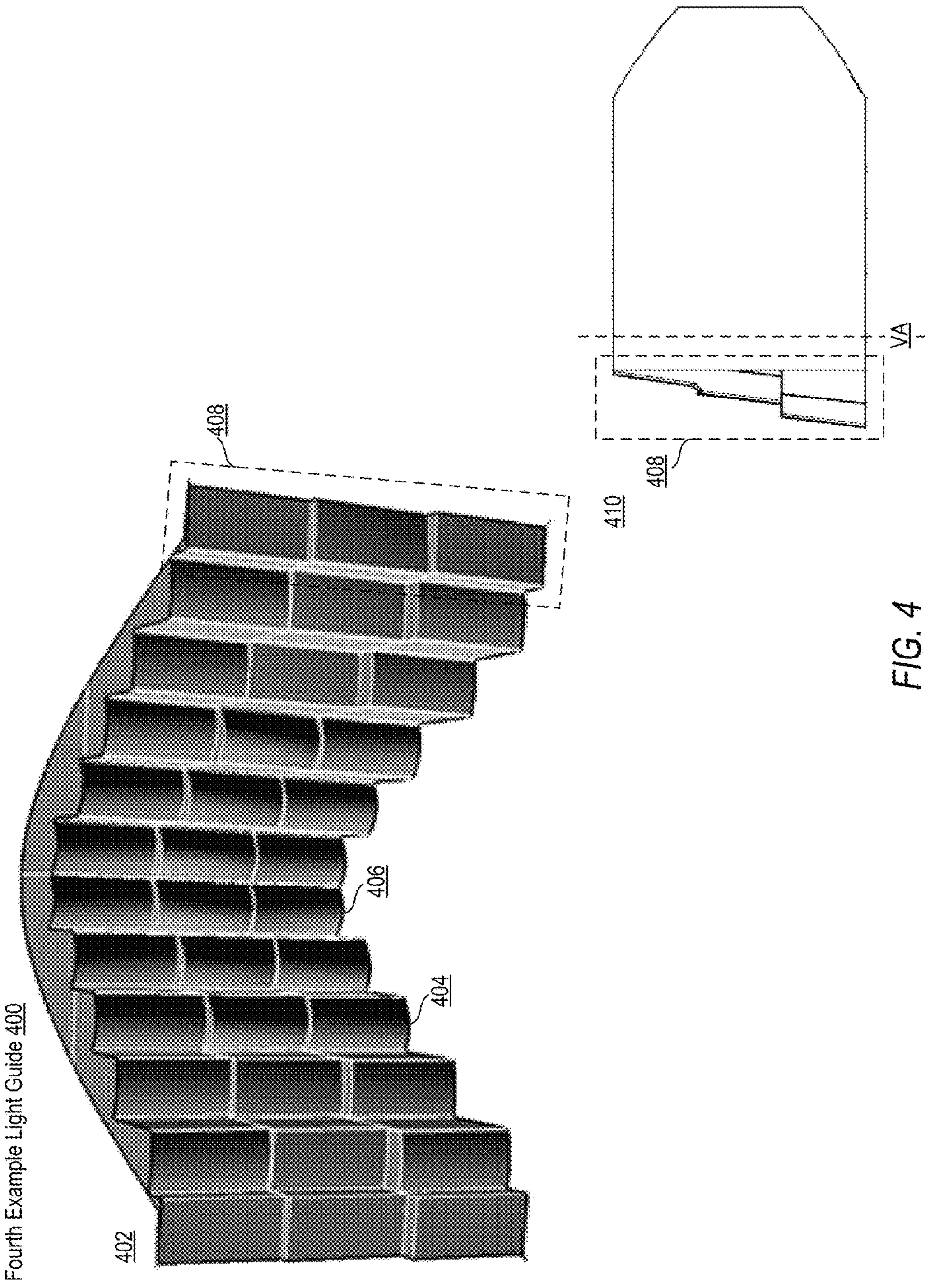
FIG. 4 illustrates a fourth example light guide from various directions consistent with the present disclosure.

FIG. 4 illustrates a fourth example light guide 400 from various directions consistent with the present disclosure. The fourth example light guide 400 presents examples of modifications that may be made to surfaces of distal end 106 to control the characteristics of the emitted light beam. For example, surfaces previously shown as planar may be rounded (e.g., made convex or concave) or gradually stepped to change the size, shape or emission direction of the light beam.

FIG. 4 illustrated the fourth example light guide 400 from a perspective view 402 and a second side view 410. The perspective view 402 illustrates at 404 how the optical face 116 of one or more steps 114 may be rounded. Rounding the optical face 116 of one or more steps may cause the emitted light beam to spread out over distance. This same effect is realized by rounding at least a portion of central surface 112 as shown at 406. Having the emitted light beam expand over distance may be beneficial in vehicular headlights in that a wider span in front of a driver may be illuminated, providing greater visibility. While the surfaces 404 and 406 are illustrated as convex, they could also be concave, rotated, slanted, etc. Moreover, the optical face 116 of the fourth example light guide 400 may be stepped along VA as shown at 408 in the perspective view 402 and in the second side view as shown at 410. The stepped surface 408 controls how the light beam is emitted from fourth example light guide

400. For example, the light beam emerges in a direction opposite of the direction in which the stepped surface extends. For example, as shown at 408 in FIG. 2 if the stepped surface extends downwards along VA, then the light beam would be focused upward based on, for example, the degree of stepping in the surface as shown at 408.

Figure 5:
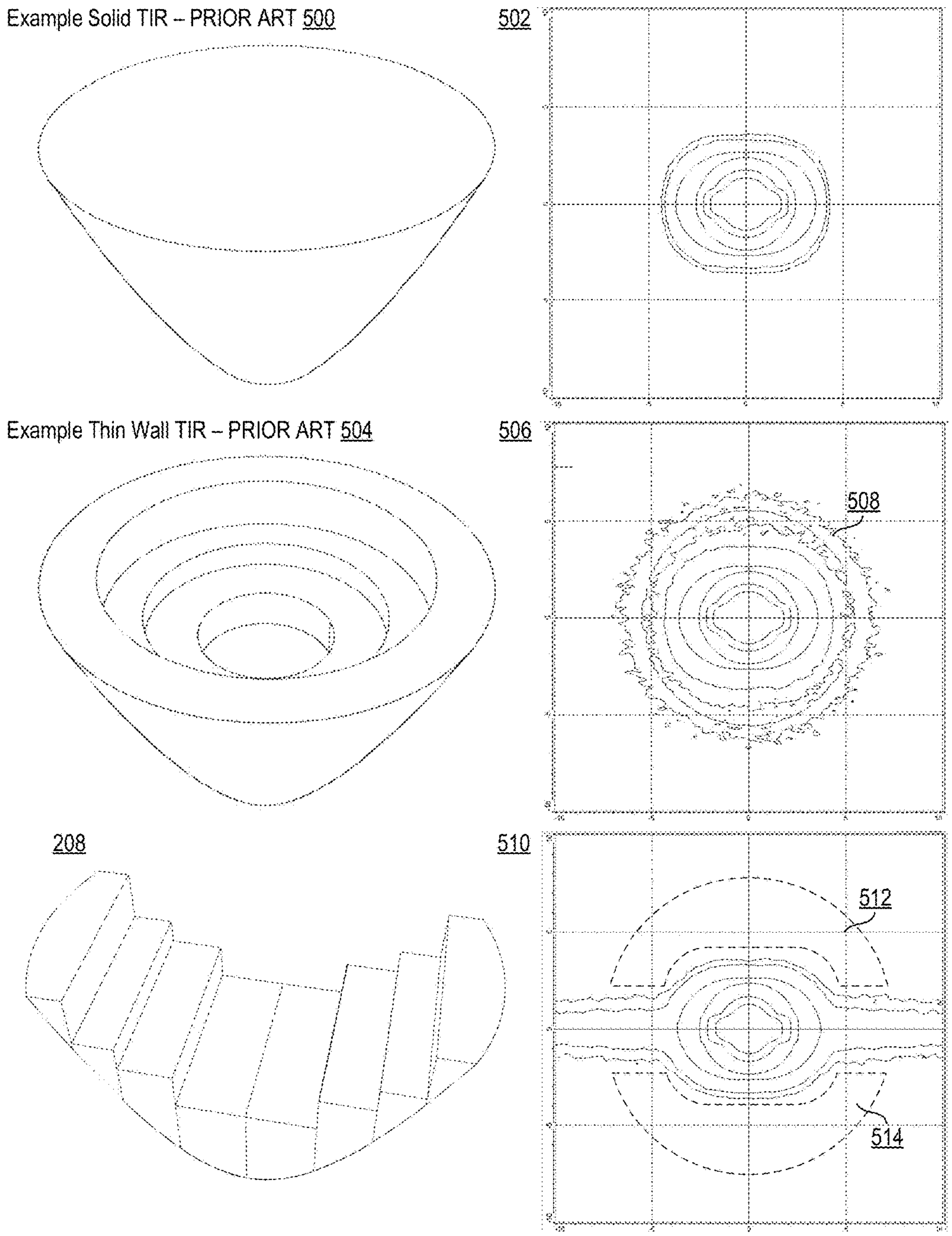
FIG. 5 illustrates different types of light guide types and, based on simulations modeled by computer, corresponding isocandela plots that approximate light output from each of the different TIR light guide types consistent with the present disclosure.

FIG. 5 illustrates different types of light guide types and, based on simulations modeled by computer, corresponding isocandela plots that approximate light output from each of the different TIR light guide types consistent with the present disclosure. As mentioned above, different configurations of light guides may generate different types of beam emissions. In FIG. 5 a conventional solid TIR light guide is illustrated at 500, a conventional thin wall TIR light guide is illustrated at 504, both of which are rotationally symmetric. Second example light guide 200 is also shown in FIG. 5 representative of the various light guides consistent with the present disclosure. Isocandela plots are illustrated at 502, 506 and 510 corresponding to the light guides at 500, 504 and 208, respectively. The isocandela plots approximate the luminous intensity of the emitted light beam over a certain area based on computer simulation. The purpose of FIG. 5 is to illustrate at least one benefit that is realized through light guide configurations consistent with the present disclosure.

Based on computer simulation, the prior art solid TIR light guide 500 has an isocandela plot as illustrated at 502. The light beam emitted by the solid TIR light guide may be tightly constrained and have little or no glare as shown by the centralized disposition of the plot. However, as mentioned above it is difficult to manufacture the solid TIR light guide 500, especially in larger sizes like those needed for vehicular headlights. The prior art thin wall TIR light guide 504 is much easier to manufacture than the solid TIR light guide 500, but computer simulation demonstrates increased glare in all directions, as is evident in the isocandela plot 506. While a constrained central beam portion is present similar to that of the simulation of the solid TIR light guide 500, a substantial amount of unfocused light (e.g., glare) is evident surrounding the central beam portion (e.g., in the halo area identified by 508). The vertical portions of the glare 508 are caused by portions of the orbital steps of thin wall TIR light guide 504 that rise above and fall below a bisecting horizontal axis of the thin wall TIR light guide 504 (e.g., all curved lens portions above and below horizontal). At least the vertical portions of the glare 508 are undesirable for vehicular headlights as the glare 508 can obstruct the view of drivers.

The weaknesses of thin wall TIR light guide 504 are overcome by the light guide 208 and other light guide configurations consistent with the present disclosure. As shown in the simulated isocandela plot 510, at least the vertical and horizontal glare portions seen at 508 in isocandela plot 506 are now eliminated through at least the advent of the linear steps 116 (e.g., the missing portions of the glare 508 are highlighted as missing at 512 and 514, respectively). While some horizontal portions of the glare 508 still exist, when used in vehicular headlight applications these portions of the glare 508 do not interrupt the vision of drivers. As a result, consistent with the present disclosure the benefits of thin wall TIR light guide manufacturing may be realized with substantially improved light beam emission performance (e.g., reduced vertical glare) when compared to existing thin wall TIR light guides such as illustrated at 504.

The description of the invention and its applications as set forth herein is illustrative and is not intended to limit the scope of the invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

GLOSSARY: a non-limiting summary of above reference numerals

100 first example light guide
102 first side view of example light guide
104 proximal end of example light guide
106 distal end of example light guide
108 example light source
110 stepped portion of distal end
112 central surface of stepped portion
114 step of stepped portion
116 optical face of step
118 transverse face of step
120 recess formed in proximal end
122 lens formed in recess
124 lateral surface of example light guide
126 first side view of example light guide
128 perspective view of example light guide
130 second side view of example light guide
200 second example light guide
202 first side view of second example light guide
204 planar portion of lateral surface of second example light guide
206 first side view of second example light guide
208 perspective view of second example light guide
210 second side view of second example light guide
300 third example light guide
302 front view of third example light guide
304 angled version of outermost linear step
θ angle of outermost linear step
306 perspective view of third example light guide
400 fourth example light guide
402 perspective view of fourth example light guide
404 convex optical face in fourth example light guide
406 convex central surface in fourth example light guide
408 vertically stepped optical face
410 second side view of fourth example light guide
500 perspective view of example solid TIR light guide
502 isocandela plot of solid TIR light guide
504 perspective view of example orbital thin wall TIR light guide
506 isocandela plot of orbital thin wall TIR light guide
508 vertical glare portion of light emission
510 isocandela plot of second example light guide
512 upper eliminated glare portion in isocandela view
514 lower eliminated glare portion in isocandela view

What is claimed:

1. A lamp optic, comprising:
a light guide (100) to receive light from a light source (108) and generate a light beam from the received light by internal reflection, the light guide (100) including:
a proximal end (104) to receive the light from the light source (108);
a distal end (106) to emit the light beam;
an optical axis (OA) extending from the proximal end (104) to the distal end (106); and
a transverse axis (TA) extending perpendicular to the optical axis (OA),
a surface of the distal end having a stepped portion (110) formed therein, the stepped portion including a central surface (112) substantially parallel to the transverse axis (TA) and centered on the optical axis (OA), and linear steps (114) extending in opposing directions from the central surface (112) parallel to the transverse axis (TA) and along the optical axis (OA) towards the distal end (106), each of the linear steps (114) including an optical face (116) extending perpendicular to the optical axis (OA) and a transverse face (118) extending perpendicular to the transverse axis (TA); and wherein a collimating lens (122) is disposed on the proximal end to receive the light from the light source (108), the collimating lens being optically coupled to the central surface (112).

2. The lamp optic of claim 1, wherein the proximal end (104) comprises a recess (120) formed therein to receive the light source (108).

3. The lamp optic of claim 1, wherein the light source (108) comprises at least one light emitting diode (LED).

4. The lamp optic of claim 1 wherein in each of the linear steps (114) the optical face (116) is orthogonal to the transverse face (118).

5. The lamp optic of claim 1, wherein the optical face (116) of each of the linear steps (114) is planar.

6. The lamp optic of claim 1, wherein the optical face (116) of at least a portion of the linear steps (114) is convex or concave.

7. The lamp optic of claim 1, wherein the central surface (112) includes at least one convex or concave portion.

8. The lamp optic of claim 1, wherein at least the linear steps (114) are to substantially reduce the amount of glare in the light beam emitted along a vertical axis (VA) perpendicular to both the optical axis (OA) and the transverse axis (TA).

9. The lamp optic of claim 1, further comprising a lateral surface (124) extending from a location adjacent the stepped portion (110) to a location adjacent the proximal end (104).

10. The lamp optic of claim 9, wherein the lateral surface (124) is configured to totally reflect the light internal to the light guide (100).

11. The lamp optic of claim 9, wherein the lateral surface (124) includes at least two planar portions (204) on opposing sides of the light guide (100).

12. The lamp optic of claim 11, wherein the at least two planar portions (204) are arranged perpendicular to a vertical axis (VA) perpendicular to both the optical axis (OA) and the transverse axis (TA).

13. The lamp optic of claim 1, wherein at least one outermost linear step (304) is angled (θ) with respect to a vertical axis (VA) perpendicular to both the optical axis (OA) and the transverse axis (TA).

14. The lamp optic of claim 13, wherein the angle (θ) is fifteen degrees from the vertical axis.

15. The lamp optic of claim 13, wherein the at least one outermost linear step (304) is a draft wall configured to modify the light beam to have an emission pattern that complies with Economic Commission of Europe (ECE) regulations.

16. The lamp optic of claim 1, wherein the optical face (116) of each step (114) is further stepped (408) along a vertical axis (VA) perpendicular to both the optical axis (OA) and the transverse axis (TA).

17. The lamp optic of claim 1, wherein the lamp optic is molded.

18. The lamp optic of claim 1 wherein the light guide (100) comprises at least one of a glass or a plastic.

19. The lamp optic of claim 18, wherein the light guide (100) comprises at least one of a polycarbonate, an acrylic or a silicone.

20. The lamp optic of claim 1, wherein the collimating lens is formed as a convex lens.

21. The lamp optic in claim 1, wherein the central surface (112) substantially parallel to the transverse axis (TA) is planar.

22. The lamp optic of claim 1, wherein the central surface (112) substantially parallel to the transverse axis (TA) is planar over a region extending between the opposing transverse faces (118) bounding the central surface (112).

23. The lamp optic of claim 1, wherein at least two said transverse faces (118) are disposed on either side of the optical axis (OA).

* * * * *